US008246379B1

(12) United States Patent
Zhang et al.

(10) Patent No.: US 8,246,379 B1
(45) Date of Patent: Aug. 21, 2012

(54) BATTERY CONNECTOR

(75) Inventors: Hong-Tu Zhang, Guang-Dong (CN);
Ping-Chih Chen, New Taipei (TW);
Ming-Chiang Chen, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/091,114

(22) Filed: Apr. 20, 2011

(51) Int. Cl.
*H01R 3/00* (2006.01)
(52) U.S. Cl. .................................................. 439/500
(58) Field of Classification Search ............ 439/500, 439/350, 824, 65, 83, 671; 429/96, 9, 100, 429/406
See application file for complete search history.

(56) References Cited

U.S. PATENT DOCUMENTS

| | | | | |
|---|---|---|---|---|
| 4,863,812 A * | 9/1989 | Ueda et al. | ........................ | 429/9 |
| 4,998,888 A * | 3/1991 | Link et al. | ........................ | 439/73 |
| 5,007,859 A * | 4/1991 | Sangregory et al. | ........... | 439/500 |
| 5,315,336 A * | 5/1994 | Suzuka et al. | ................. | 396/539 |
| 5,395,263 A * | 3/1995 | Sandell | ........................ | 439/500 |
| 5,505,635 A * | 4/1996 | Willows et al. | ............... | 439/500 |
| 5,641,315 A * | 6/1997 | Swart et al. | ................... | 439/824 |
| 5,922,489 A * | 7/1999 | Adachi | ........................ | 429/100 |
| 5,980,309 A * | 11/1999 | Frantz et al. | ................... | 439/500 |
| 6,077,130 A * | 6/2000 | Hughes et al. | ................ | 439/862 |
| 6,623,293 B1 * | 9/2003 | Wu | ................................ | 439/500 |
| 6,794,074 B2 * | 9/2004 | Vu et al. | ........................ | 429/406 |
| 7,029,287 B2 * | 4/2006 | Matsunaga et al. | ............. | 439/65 |
| 7,105,247 B2 * | 9/2006 | Suzuki | ............................. | 429/96 |
| 7,727,007 B2 * | 6/2010 | Sun | ................................. | 439/500 |
| D620,435 S * | 7/2010 | Yang et al. | .................... | D13/120 |
| 7,803,011 B1 * | 9/2010 | Mai | ................................. | 439/500 |
| D643,368 S * | 8/2011 | Zhang et al. | .................. | D13/120 |

* cited by examiner

*Primary Examiner* — Alexander Gilman
(74) *Attorney, Agent, or Firm* — Cheng-Ju Chiang

(57) ABSTRACT

A battery connector includes an insulating body having a base board and a fastening tongue protruding upward and then extending forward from a rear of the base board, and an electrical terminal which has a base plate, two elastic arms parallel and apart located over the base plate by means of two rear ends thereof curvedly connected with a rear edge of the base plate respectively, and two contact arms oppositely extending outward from two front ends of the elastic arms. The base plate is inserted rearward to be clipped between the fastening tongue and the base board, and the elastic arms are located at two opposite sides of the fastening tongue. The contact arms can be respectively connected with the positive electrode of one of two batteries and the negative electrode of the other battery to realize a series connection between the two batteries.

4 Claims, 3 Drawing Sheets

BATTERY CONNECTOR

BACKGROUND OF THE INVENTION

1. Field of the Invention

The present invention relates to a connector, and more particularly to a battery connector capable of achieving a series connection between two batteries.

2. The Related Art

A traditional battery connector is used to receive one battery therein so as to realize an electrical connection between the battery and a printed circuit board. When two batteries need to be connected in series with each other, there are two battery connectors needed to respectively connect the positive electrode of one of the two batteries and the negative electrode of the other battery. The two battery connectors are further connected with the printed circuit board. So the series connection between the two batteries can be realized by means of the two battery connectors and the printed circuit board. However, the above-mentioned method of realizing the series connection between the two batteries needs the cooperation of the two battery connectors and the printed circuit board, so that results in a complicated structure, and needs a large space for the two battery connectors and the printed circuit board and greater costs for realizing the series connection between the two batteries. Furthermore, the series connection between the two batteries is apt to be influenced by the bad contact happening between the battery connectors and the printed circuit board.

SUMMARY OF THE INVENTION

An object of the present invention is to provide a battery connector for realizing a series connection between two batteries. The battery connector includes an insulating body having a base board, and an electrical terminal. Two sides of a top surface of the base board protrude upward to form a pair of blocking walls. A rear of the top surface of the base board protrudes upward and then extends forward to form a fastening tongue spaced from the top surface of the base board to define a fastening slot between the fastening tongue and the top surface of the base board. The fastening tongue is located between and apart from the pair of blocking walls. The electrical terminal has a base plate, a pair of elastic arms parallel and apart located over the base plate by means of two rear ends thereof curvedly connected with two ends of a rear edge of the base plate respectively, and a pair of contact arms oppositely extending outward from two front ends of the pair of elastic arms and each further inclined upward. The base plate is inserted rearward in the fastening slot of the insulating body to be clipped between the fastening tongue and the base board. The elastic arms are respectively located between the fastening tongue and the blocking walls, with the contact arms oppositely projecting out of the corresponding blocking walls. The pair of contact arms of the electrical terminal can be respectively connected with the positive electrode of one of the two batteries and the negative electrode of the other battery, to realize the series connection between the two batteries only by means of the electrical terminal.

As described above, the battery connector of the present invention utilizes the two contact arms of the electrical terminal to respectively connect the positive electrode of one battery and the negative electrode of the other battery, so as to realize the series connection between the two batteries. So the battery connector of the present invention has a simple structure. It further needs a smaller space only for the battery connector, and reduces costs for realizing the series connection between the two batteries. Furthermore, a better connection can be ensured between the two batteries on account of only utilizing the electrical terminal to electrically connect the two batteries together.

BRIEF DESCRIPTION OF THE DRAWINGS

The present invention will be apparent to those skilled in the art by reading the following description thereof, with reference to the attached drawings, in which.

DETAILED DESCRIPTION OF THE PREFERRED EMBODIMENT

Figure 1:
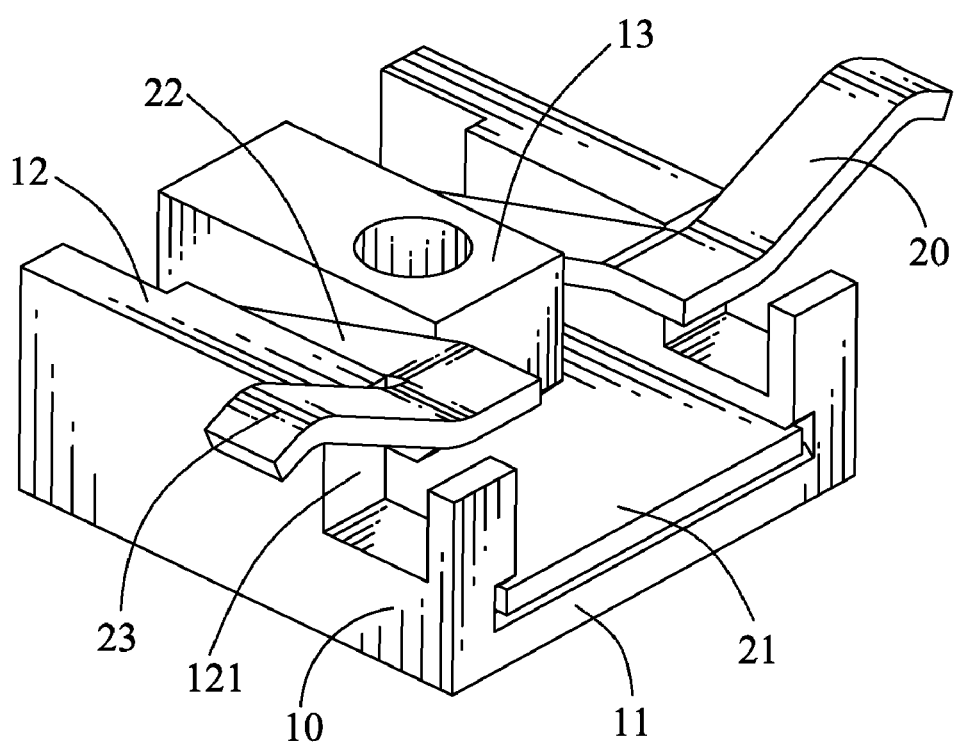
FIG. 1 is an assembled perspective view of a battery connector according to an embodiment of the present invention.
Figure 2:
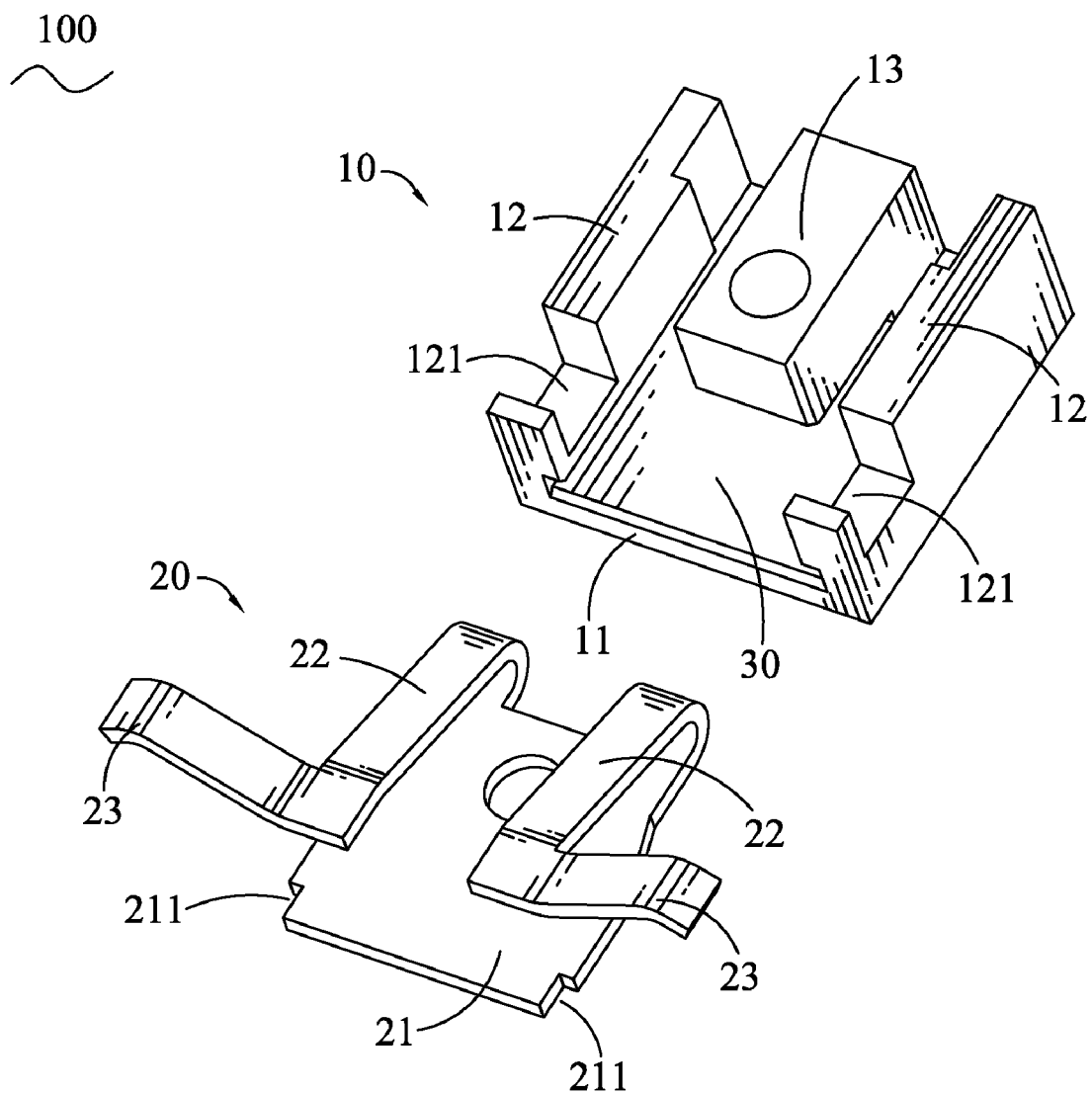
FIG. 2 is an exploded perspective view of the battery connector of FIG. 1.

With reference to FIG. 1 and FIG. 2, a battery connector 100 according to an embodiment of the present invention is adapted to achieve a series connection between two batteries (not shown). The battery connector 100 includes an insulating body 10 and an electrical terminal 20 mounted in the insulating body 10.

Figure 3:
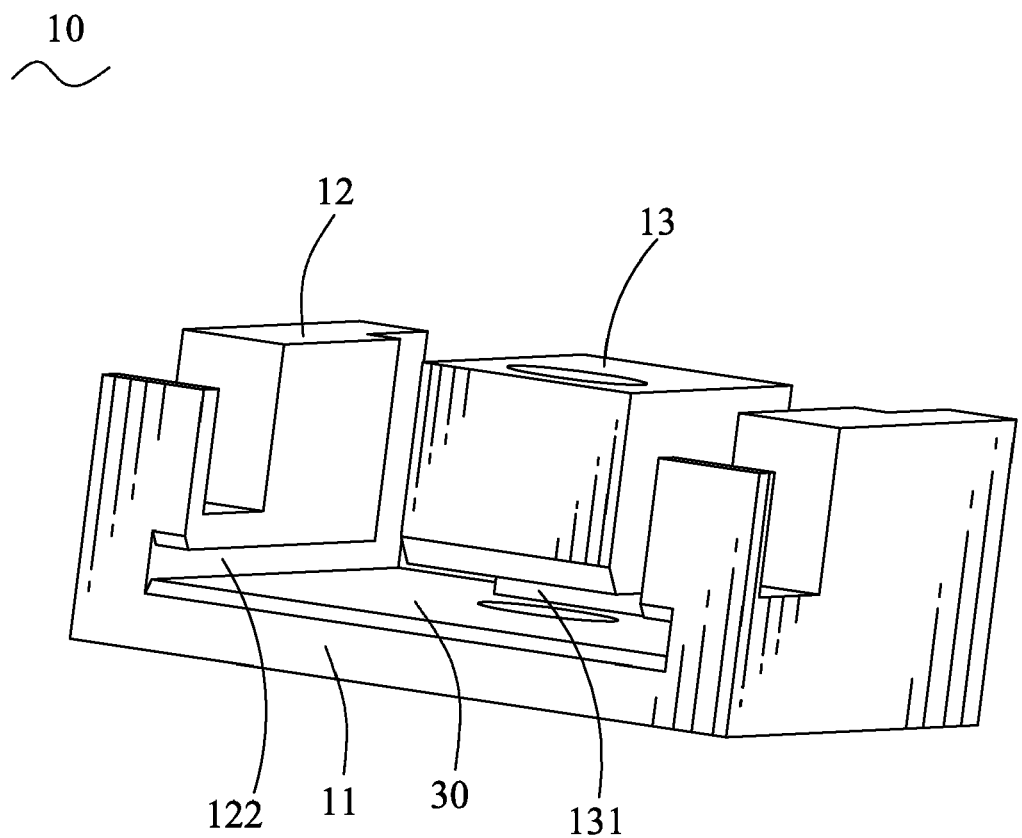
FIG. 3 is a perspective view of an insulating body of the battery connector of FIG. 1.

Referring to FIGS. 2-3, the insulating body 10 has a rectangular base board 11 of which two opposite sides of a top surface 30 protrude upward to form a pair of blocking walls 12. A middle of a rear of the top surface 30 of the base board 11 protrudes upward and then extends forward to form a fastening tongue 13 spaced from the top surface 30 of the base board 11 to define a fastening slot 131 between the fastening tongue 13 and the top surface 30 of the base board 11. The fastening tongue 13 is located between and apart from the pair of blocking walls 12. A pair of fixing fillisters 122 is face-to-face opened at two insides of the pair of blocking walls 12. Each of the fixing fillisters 122 extends along a front-to-rear direction of the respective blocking wall 12 and is adjacent to the top surface 30 of the base board 11. A front of a top of each blocking wall 12 defines a restraining fillister 121 penetrating through two opposite sides of the blocking wall 12.

Referring to FIG. 2 again, the electrical terminal 20 has a substantially rectangular base plate 21, a pair of elastic arms 22 parallel and apart located over the base plate 21 by means of two rear ends thereof curvedly connected with two ends of a rear edge of the base plate 21 respectively, and a pair of contact arms 23 oppositely extending outward from two front ends of the pair of elastic arms 22. Each of the contact arms 23 is substantially perpendicular to the corresponding elastic arm 22 and further inclined upward with a distal end thereof slightly bent downward. Two front portions of two opposite side edges of the base plate 21 are cut off to form two fastening gaps 211.

Referring to FIGS. 1-3, in assembly, the electrical terminal 20 is inserted rearward in the insulating body 10, with the two opposite side edges of the base plate 21 inserted in the fixing fillisters 122 respectively, a middle of a rear of the base plate 21 inserted in the fastening slot 131, and the fastening tongue 13 resisting against a top of the base plate 21 to make the base plate 21 abut against the top surface 30 of the base board 11. So the base plate 21 can be firmly fastened in the insulating body 10. The elastic arms 22 are respectively located between the fastening tongue 13 and the blocking walls 12, with the contact arms 23 passing through the restraining fillisters 121 respectively to oppositely project out of the insulating body 10. Some plastic materials may be pressed into the fastening gaps 211 of the base plate 21 under the action of the two opposite side edges of the base plate 21 squeezing insides of the corresponding fixing fillisters 122, so that further reinforces the assembly between the electrical terminal 20 and the insulating body 10.

In use, one contact arm 23 of the electrical terminal 20 is electrically connected with the positive electrode of one of the two batteries which need to be connected in series with each other, and the other contact arm 23 of the electrical terminal 20 is electrically connected with the negative electrode of the other battery. So the series connection is achieved between the two batteries only by means of the electrical terminal 20.

As described above, the battery connector 100 of the present invention utilizes the two contact arms 23 of the electrical terminal 20 to respectively connect the positive electrode of one battery and the negative electrode of the other battery, so as to realize the series connection between the two batteries. So the battery connector 100 of the present invention has a simple structure. It further needs a smaller space only for the battery connector 100, and reduces costs for realizing the series connection between the two batteries. Furthermore, a better connection can be ensured between the two batteries on account of only utilizing the electrical terminal 20 to electrically connect the two batteries together.

What is claimed is:

1. A battery connector for realizing a series connection between two batteries, comprising:

an insulating body having a base board, two sides of a top surface of the base board protruding upward to form a pair of blocking walls, a rear of the top surface of the base board protruding upward and then extending forward to form a fastening tongue spaced from the top surface of the base board to define a fastening slot between the fastening tongue and the top surface of the base board, the fastening tongue being located between and apart from the pair of blocking walls; and an electrical terminal having a base plate, a pair of elastic arms parallel and apart located over the base plate by means of two rear ends thereof curvedly connected with two ends of a rear edge of the base plate respectively, and a pair of contact arms oppositely extending outward from two front ends of the pair of elastic arms and each further inclined upward, the base plate being inserted rearward in the fastening slot of the insulating body to be clipped between the fastening tongue and the base board, the elastic arms being respectively located between the fastening tongue and the blocking walls, with the contact arms oppositely projecting out of the corresponding blocking walls, wherein the pair of contact arms of the electrical terminal can be respectively connected with the positive electrode of one of the two batteries and the negative electrode of the other battery, to realize the series connection between the two batteries only by means of the electrical terminal.

2. The battery connector as claimed in claim 1, wherein a pair of fixing fillisters is opened at two insides of the pair of blocking walls, each of the fixing fillisters extends along a front-to-rear direction of the respective blocking wall and is adjacent to the top surface of the base board, two opposite side edges of the base plate are inserted in the fixing fillisters respectively.

3. The battery connector as claimed in claim 2, wherein two fastening gaps are opened at two front portions of the two opposite side edges of the base plate respectively for congregating some plastic materials therein under the action of the two opposite side edges of the base plate squeezing insides of the corresponding fixing fillisters.

4. The battery connector as claimed in claim 1, wherein a top of each blocking wall defines a restraining fillister penetrating through two opposite sides of the blocking wall, the contact arms pass through the restraining fillisters respectively to oppositely project out of the insulating body.

\* \* \* \* \*